(12) United States Patent
Yao et al.

(10) Patent No.: US 12,468,896 B2
(45) Date of Patent: Nov. 11, 2025

(54) METHOD AND APPARATUS FOR ZERO-SHOT NATURAL LANGUAGE PROCESSING USING VISUAL IMAGINATION

(71) Applicant: Tencent America LLC, Palo Alto, CA (US)

(72) Inventors: Wenlin Yao, College Station, TX (US); Hongming Zhang, Palo Alto, CA (US); Xiaoyang Wang, Palo Alto, CA (US); Dong Yu, Palo Alto, CA (US); Jianshu Chen, Palo Alto, CA (US); Yue Yang, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 346 days.

(21) Appl. No.: 18/077,693

(22) Filed: Dec. 8, 2022

(65) Prior Publication Data

US 2024/0193375 A1   Jun. 13, 2024

(51) Int. Cl.
*G06F 40/40* (2020.01)
(52) U.S. Cl.
CPC ................... *G06F 40/40* (2020.01)
(58) Field of Classification Search
CPC ............... G06F 40/00; G06F 40/40
See application file for complete search history.

(56) References Cited

U.S. PATENT DOCUMENTS

2019/0197154 A1*   6/2019   Cohen ................. G06F 16/583

FOREIGN PATENT DOCUMENTS

WO   2022/174161 A1   8/2022
WO   2022/228958 A1   11/2022

OTHER PUBLICATIONS

Brown, T., Mann, B., Ryder, N., Subbiah, M., Kaplan, J.D., Dhariwal, P., Neelakantan, A., Shyam, P., Sastry, G., Askell, A. and Agarwal, S., 2020. Language models are few-shot learners. Advances in neural information processing systems, 33, pp. 1877-1901. (Year: 2020).*

Zhang, L., Chen, Q., Li, D. and Tang, B., 2019. Semi-supervised Visual Feature Integration for Pre-trained Language Models. arXiv preprint arXiv:1912.00336. (Year: 2019).*

(Continued)

*Primary Examiner* — Daniel C Washburn
*Assistant Examiner* — Sean E Serraguard
(74) *Attorney, Agent, or Firm* — Sughrue Mion, PLLC

(57) ABSTRACT

A method performed by at least one processor includes receiving a first input stream of a task and a second input stream of a solution. The method further includes selecting the first input stream or the second input stream. The method further includes providing the selected input stream to an image conversion model and a language model. The method further includes creating, based on the selected input stream, a model ensemble of the conversion model and the language model. The method further includes outputting a prediction based on the model ensemble. The method may further include generating an image corresponding to text, converting a textual task into a multimodal task, and solving the multimodal task.

20 Claims, 12 Drawing Sheets

(56) References Cited

OTHER PUBLICATIONS

Zhang, H., Xu, T., Li, H., Zhang, S., Wang, X., Huang, X. and Metaxas, D.N., 2018. Stackgan++: Realistic image synthesis with stacked generative adversarial networks. IEEE transactions on pattern analysis and machine intelligence, 41(8), pp. 1947-1962. (Year: 2018).*
Yang, Y., Yao, W., Zhang, H., Wang, X., Yu, D. and Chen, J., 2022. Z-lavi: Zero-shot language solver fueled by visual imagination. arXiv preprint arXiv:2210.12261. (Year: 2022).*
Radford, A., Kim, J.W., Hallacy, C., Ramesh, A., Goh, G., Agarwal, S., Sastry, G., Askell, A., Mishkin, P., Clark, J. and Krueger, G., 2021, July. Learning transferable visual models from natural language supervision. In International conference on machine learning (pp. 8748-8763). PMLR. (Year: 2021).*
Chordia, V., & BG, V. K. (2020). Large scale multimodal classification using an ensemble of transformer models and co-attention. arXiv preprint arXiv:2011.11735. (Year: 2020).*
D. Jimenez, "Dynamically weighted ensemble neural networks for classification," 1998 IEEE International Joint Conference on Neural Networks Proceedings. IEEE World Congress on Computational Intelligence (Cat. No.98CH36227), Anchorage, AK, USA, 1998, pp. 753-756 vol. 1, doi: 10.1109/IJCNN.1998.682375. (Year: 1998).*
Lawrence, S., Giles, C.L. and Tsoi, A.C., 1998. What size neural network gives optimal generalization? Convergence properties of backpropagation (p. 4). Digital Repository at the University of Maryland. (Published on Oct. 15, 1998)(Retrieved from Internet on Feb. 5, 2025) (Year: 1998).*
Ang, P., Dhingra, B. and Wills, L.W., 2022. Characterizing the efficiency vs. accuracy trade-off for long-context NLP models. arXiv preprint arXiv:2204.07288 (Year: 2022).*
Kafle, Kushal, Robik Shrestha, Scott Cohen, Brian Price, and Christopher Kanan. "Answering questions about data visualizations using efficient bimodal fusion." In Proceedings of the IEEE/CVF Winter conference on applications of computer vision, pp. 1498-1507. 2020. (Year: 2020).*
Kafle, Kushal, Robik Shrestha, Scott Cohen, Brian Price, and Christopher Kanan. "Answering questions about data visualizations using efficient bimodal fusion." In Proceedings of the IEEE/CVF Winter conference on applications of computer vision, pp. 1498-1507. (Year: 2020).*
International Search Report dated Jun. 14, 2023 in Application No. PCT/US23/15360.
Written Opinion of the International Searching Authority dated Jun. 14, 2023 in Application No. PCT/US23/15360.

* cited by examiner

FIG 1B
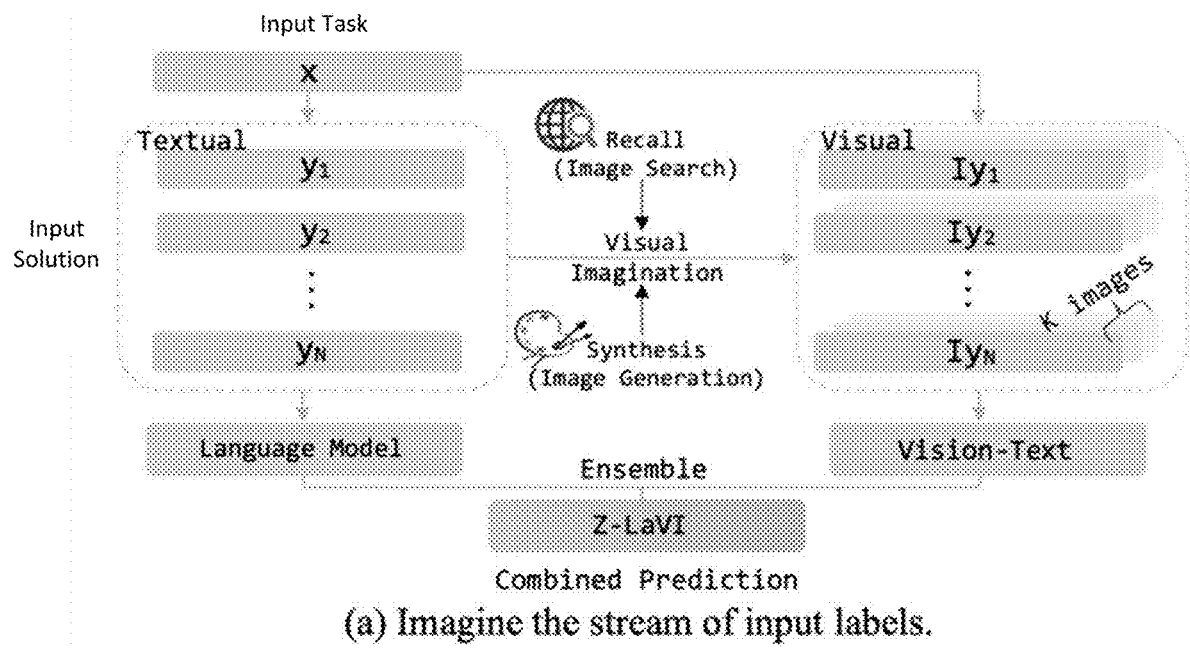
(a) Imagine the stream of input labels.
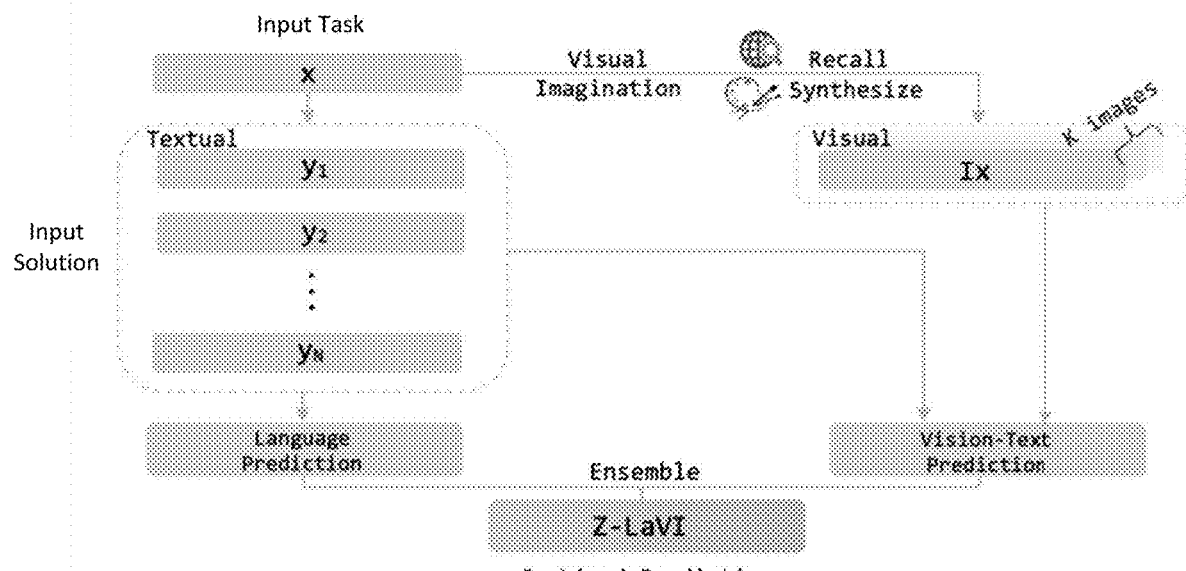
(b) Imagine the stream of input instance.

Natural Language Inference

FIG. 3C        Latent Embedding Language Inference
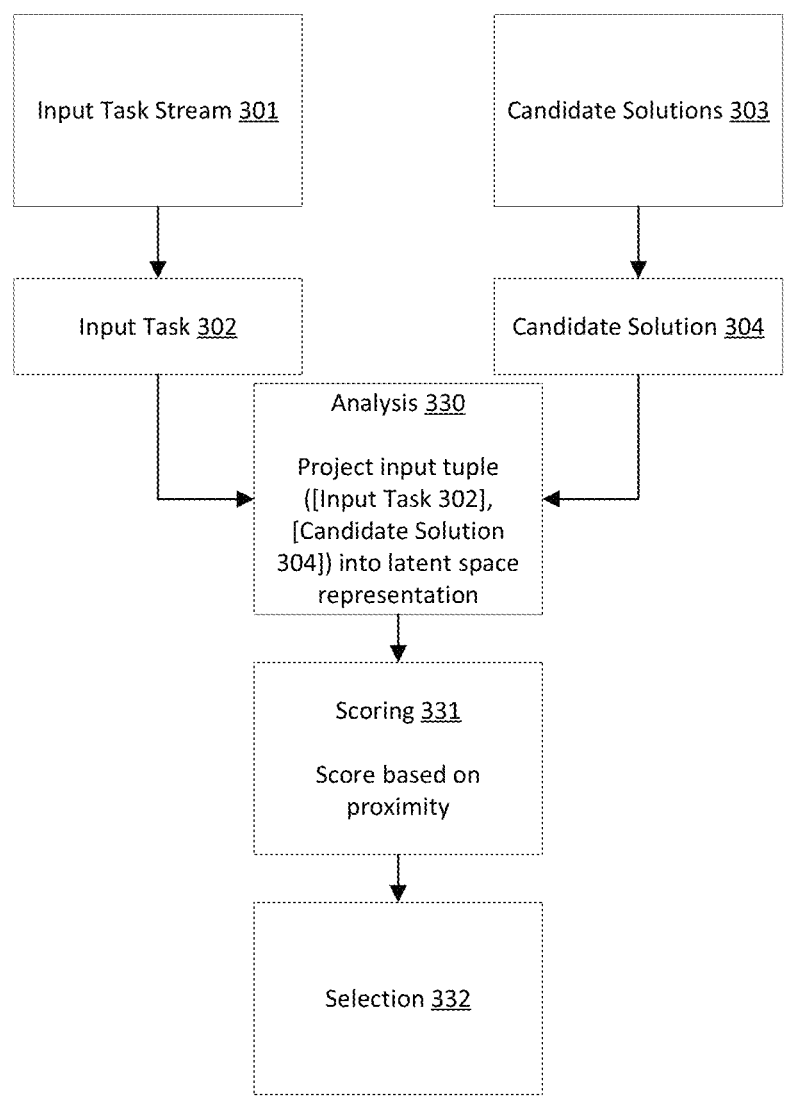

FIG. 5

| Text | Imagination |
|---|---|
| (a) Pharmacy chain CVS Corp. on Thursday said it would offer the world's first disposable digital camera with a bright color viewing screen that allows consumers to instantly preview pictures. | 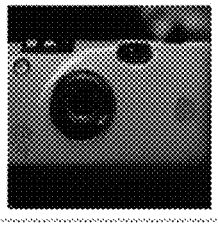 |
| LM: business news ✗ | Z-LaVI: technology news ✓ |
| (b) Boro left feeling Blue: Accepting mediocrity has been part and parcel of following Middlesbrough over the years, yet this campaign was supposed to bring something new. | 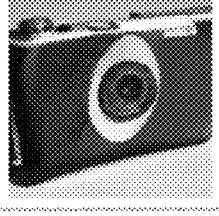 |
| LM: world news ✗ | Z-LaVI: sports news ✓ |
| (c) He urged the people to start reconstructing, at least one room, with corrugated steel sheets as roofing material, till the massive rebuilding operations gets underway. |  |
| LM: need Infrastructure ✗ | Z-LaVI: need shelter ✓ |
| (d) Earlier reports said nearly 50,000 people were driven from mudflat villages by the flooding as local rivers burst banks while the situation was exacerbated by thunderstorms. |  |
| LM: danger & evacuation ✓ | Z-LaVI: need water ✗ |

| Model | # Param. | QASC | | SciQ | | ARC-E | | ARC-C | |
|---|---|---|---|---|---|---|---|---|---|
| | | Original | Z-LaVI | Original | Z-LaVI | Original | Z-LaVI | Original | Z-LaVI |
| Random | - | 12.5 | - | 25.0 | - | 25.0 | - | 25.0 | - |
| IR Solver[‡] | - | 18.6 | - | - | - | 30.4 | - | 20.3 | - |
| SMLM[‡] | 355 M | 26.6 | - | - | - | 33.4 | - | 28.4 | - |
| RoBERTa-L-mnli* | 355 M | 19.3 | 27.2 | 44.7 | 51.3 | 48.4 | 51.8 | 34.4 | 33.4 |
| BART-L-mnli* | 400 M | 21.7 | 27.3 | 48.8 | 51.0 | 54.7 | 56.1 | 36.5 | 36.5 |
| GPT-Neo-1.3B | 1.3B | 29.3 | 37.4 | 57.5 | 60.8 | 46.3 | 49.8 | 27.4 | 26.1 |
| GPT-Neo-2.7B | 2.7B | 29.6 | 39.6 | 64.0 | 64.9 | 49.6 | 51.9 | 31.8 | 30.4 |
| GPT-J-6B | 6B | 36.3 | 42.0 | 73.2 | 73.7 | 55.1 | 57.2 | 34.8 | 34.1 |
| OPT-30B | 30B | 39.7 | 42.1 | 72.7 | 74.0 | 58.2 | 59.5 | 34.8 | 34.1 |
| SimCSE | 355M | 30.8 | 33.2 | 42.6 | 48.6 | 43.3 | 49.3 | 26.4 | 24.7 |
| SBERT* | 110M | 36.7 | 38.6 | 57.7 | 58.5 | 54.4 | 56.0 | 30.1 | 27.1 |
| Z-LaVI w/o LM | 150M | - | 32.7 | - | 49.3 | - | 50.2 | - | 26.7 |

| Model | Accuracy | | F1 | |
|---|---|---|---|---|
| | Orig. | Z-LaVI | Orig. | Z-LaVI |
| Random | 41.3 | - | 36.7 | - |
| BERT-L-1shot[†]* | 77.6 | - | 71.2 | - |
| BERT-L-3shot[†]* | 89.3 | - | 85.2 | - |
| RoBERTa-L-mnli* | 80.4 | 83.0 | 74.4 | 78.1 |
| BART-L-mnli* | 80.2 | 82.4 | 74.8 | 77.9 |
| GPT-Neo-1.3B | 84.7 | 88.4 | 78.3 | 84.6 |
| GPT-Neo-2.7B | 86.7 | 88.9 | 81.5 | 85.3 |
| GPT-J-6B | 84.1 | 88.5 | 79.3 | 84.8 |
| OPT-30B | 84.4 | 88.8 | 80.4 | 85.1 |
| SimCSE | 85.1 | 89.7 | 78.9 | 86.0 |
| SBERT* | 87.8 | 90.6 | 83.3 | 87.5 |
| Z-LaVI w/o LM | - | 87.7 | - | 83.8 |

| Model | AG-News | | Situation | |
|---|---|---|---|---|
| | Orig. | Z-LaVI | Orig. | Z-LaVI |
| Random | 25.0 | - | 9.1 | - |
| TE-wiki[†]* | 79.6 | - | - | - |
| RoBERTa-L-mnli* | 81.2 | 81.7 | 40.7 | 41.8 |
| BART-L-mnli* | 81.9 | 82.4 | 40.5 | 41.1 |
| GPT-Neo-1.3B | 59.1 | 72.9 | 17.8 | 38.5 |
| GPT-Neo-2.7B | 59.1 | 74.5 | 13.6 | 35.2 |
| GPT-J-6B | 61.0 | 73.8 | 21.9 | 38.8 |
| SimCSE | 58.1 | 73.1 | 42.1 | 44.4 |
| SBERT* | 77.8 | 82.2 | 42.6 | 46.6 |
| Z-LaVI w/o LM | - | 71.6 | - | 33.4 |

FIG. 9

METHOD AND APPARATUS FOR ZERO-SHOT NATURAL LANGUAGE PROCESSING USING VISUAL IMAGINATION

FIELD

The disclosure generally relates to natural language processing and classification.

BACKGROUND

Natural language processing is used to convert unformatted language inputs into data understandable by a computational device, which is then able to leverage its processing capabilities to respond to or otherwise solve the input(s).

Large-scale Pretrained Language Models (PLMs) have achieved great success on various Natural Language Understanding (NLU) tasks and even exhibit impressive zero-shot capabilities without task specific fine-tunings. Recent research suggests that such ability improves by further scaling up the model size (e.g., to hundreds of billions of parameters) and the amount of textual pre-training data (to TBs of raw texts).

However, zero-shot language learners solely trained on texts inevitably suffer from human reporting bias. For example, people tend not to write common or apparent things, and the frequency of a certain textual statement does not always correspond to their relative likelihood in the world. Therefore, looking into other modalities to supplement the textual information is crucial.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

According to an exemplary embodiment, a method performed by at least one processor includes receiving a first input stream of a task and a second input stream of a solution. The method further includes selecting the first input stream or the second input stream. The method further includes providing the selected input stream to an image conversion model and a language model. The method further includes creating, based on the selected input stream, a model ensemble of the image conversion model and the language model. The method further includes outputting a prediction based on the model ensemble.

According to an exemplary embodiment, an apparatus includes at least one memory configured to store program code and at least one processor configured to read the program code and operate as instructed by the program code. The program code includes receiving code configured to cause the at least one processor to receive a first input stream of a task and a second input stream of a solution. The program code includes selecting code configured to cause the at least one processor to select the first input stream or the second input stream. The program code includes providing code configured to cause the at least one processor to provide the selected input stream to an image conversion model and a language model. The program code includes ensembling code configured to cause the at least one processor to create, based on the selected input stream, a model ensemble of the image conversion model and the language model. The program code includes outputting code configured to cause the at least one processor to output a prediction based on the model ensemble.

According to an exemplary embodiment, a non-transitory computer readable medium having instructions stored therein, which when executed by a processor cause the processor to execute a method including receiving a first input stream of a task and a second input stream of a solution. The method further includes selecting the first input stream or the second input stream. The method further includes providing the selected input stream to an image conversion model and a language model. The method further includes creating, based on the selected input stream, a model ensemble of the image conversion model and the language model. The method further includes outputting a prediction based on the model ensemble.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which:

FIG. 1B is a diagram illustrating two exemplary operating modes of the Z-LaVI natural language processing method, in accordance with various embodiments.

FIG. 3C is a flowchart of a language model using latent embedding language inference, in accordance with various embodiments.

FIG. 5 shows 4 example operations of the Z-LaVI method, in accordance with various embodiments.

FIG. 9 is a series of tables demonstrating increased importance compared to peer state of the art natural language systems, in accordance with various embodiments.

DETAILED DESCRIPTION

Figure 1A:
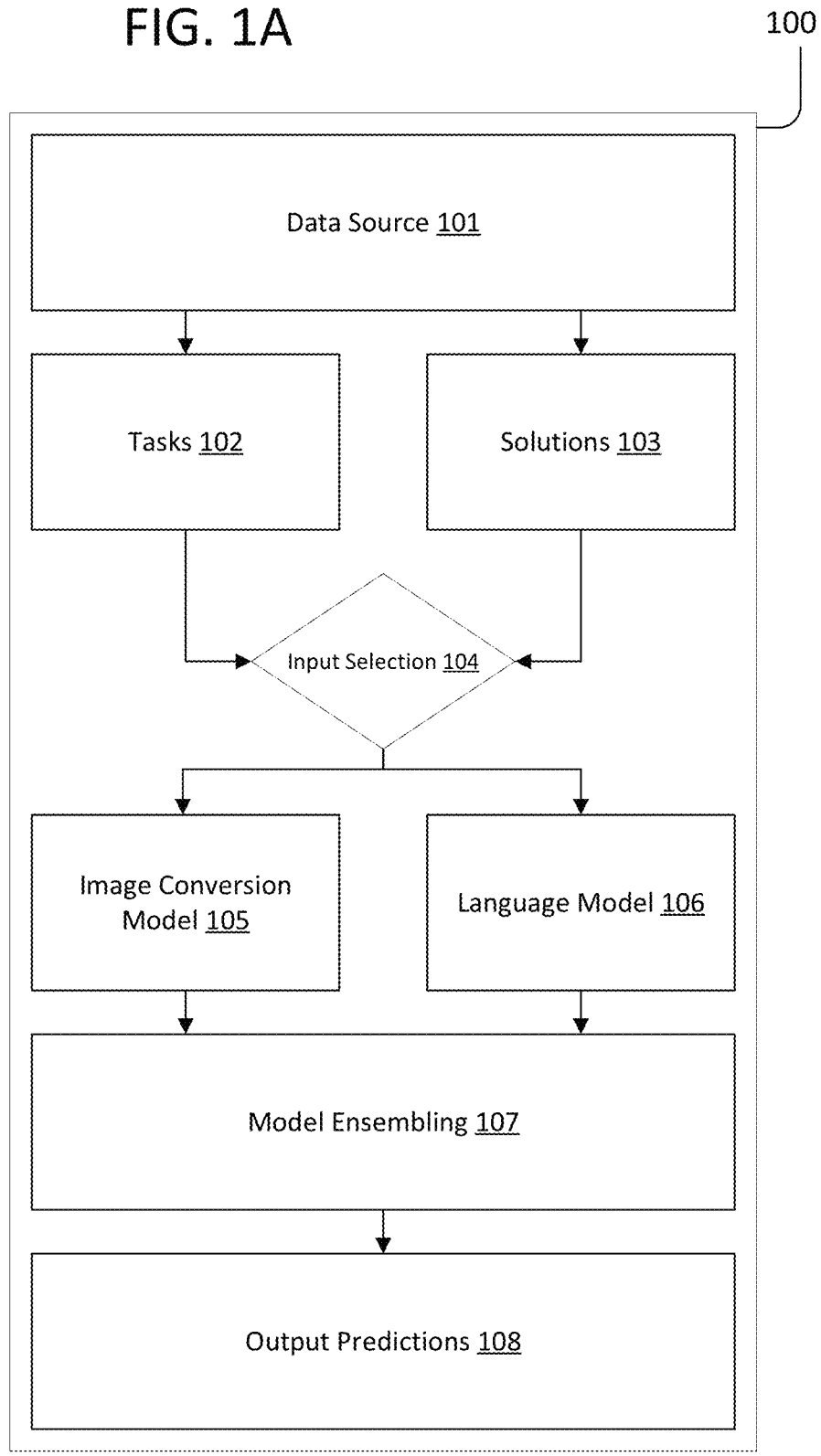
FIG. 1A is a flowchart of an example Z-LaVI natural language processing method, in accordance with various embodiments.

The following detailed description of example embodiments refers to the accompanying drawings. The same reference numbers in different drawings may identify the same or similar elements.

The foregoing disclosure provides illustration and description, but is not intended to be exhaustive or to limit the embodiments to the precise form disclosed. Modifications and variations are possible in light of the above disclosure or may be acquired from practice of the embodiments. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the embodiments. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure define a method for natural language processing and image generation. The embodiments of the present disclosure provide the significantly advantageous features of providing accurate task solutions in a zero-shot environment.

FIG. 1a illustrates an embodiment of the Z-LaVI natural language processing system 100.

Data Source 101 may include one or more devices capable of receiving, generating, storing, processing, and/or providing information. For example, the data source 101 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some embodiments, the data source 101 may receive information from and/or transmit information.

Data source 101 may include one or more devices as described elsewhere herein. In some embodiments, the data source 101 may include a cloud server or a group of cloud servers. In some embodiments, the Z-LaVI system and its subcomponents 101-108 may be designed to be modular such that software components may be swapped in or out depending on a particular need. As such, the Z-LaVI system may be easily and/or quickly reconfigured for different uses.

In some embodiments, as shown, the system 100 may be hosted in a cloud computing environment. In some embodiments, the system 100 may not be cloud-based (e.g., may be implemented outside of a cloud computing environment) or may be partially cloud-based.

The Data Source 101 provides a stream of Tasks 102 and a stream of Solutions 103 to the system.

In some embodiments, the Tasks 102 may include, but are not limited to, word sense disambiguation, science question answering, topic classification, text classification tasks, image classification tasks, and combinations therein.

In some embodiments, when the task is a word sense disambiguation task, the Solutions 103 may include all possible word senses of a target word in an input sentence, and the system may output a prediction including one or more of the most accurate word senses of a target word in an input sentence.

In some embodiments, when the task is a science question answering task, the Solutions 103 may include all the answer options for the question, and the system may output a prediction including one or more of the most accurate answers for the question.

In some embodiments, when the task is a text classification task, the Solutions 103 may include all the possible categories of the text, and the system may output a prediction including one or more of the most accurate categories of the text.

In some embodiments, Input Selection 104 may choose either the stream of Tasks 102 or the stream of Solutions 103 to provide to the Image Conversion Model 105, the Language Model 106, or both. In some embodiments, Input Selection 104 provides the chosen stream to only the Image Conversion Model 105. FIG. 1b demonstrates one way that the system may adapt to the selection of Tasks 102 or Solutions 103.

Figure 2:
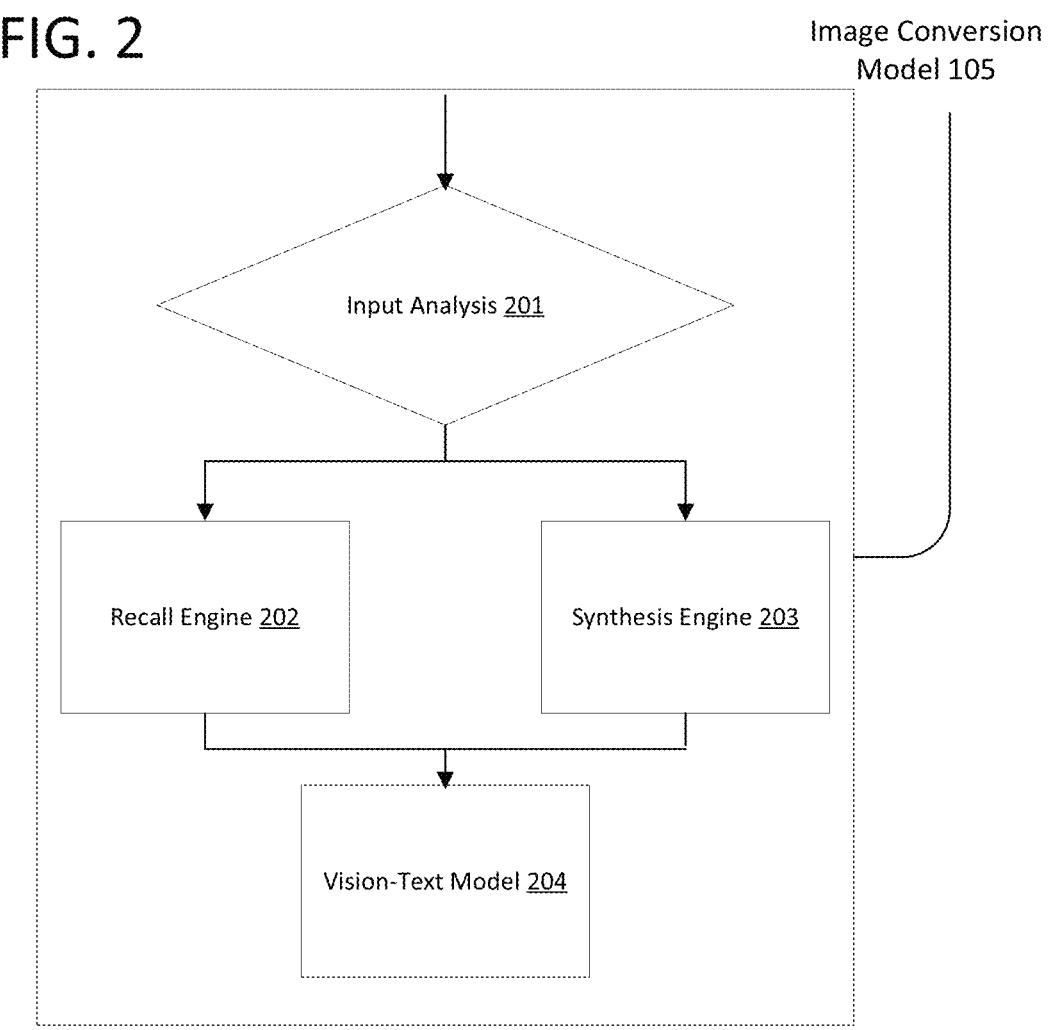
FIG. 2 is a block diagram of example components of an image conversion model, in accordance with various embodiments.

In some embodiments, the Image Conversion Model 105 may generate an image corresponding to the input stream provided by Input Selection 104. An exemplary embodiment of Image Conversion Model 105 is illustrated in FIG. 2. In some embodiments, the Image Conversion Model 105 may perform a step of Synthesis using Synthesis Engine 203, and generate a new image using a text to image generation model. In some embodiments, the text to image generation model may be a Generative Pre-trained Transformer (GPT) model. In some embodiments the text to image generation model may be a Contrastive Language-Image Pre-training (CLIP) model.

In some embodiments, the Generative Pre-trained Transformer model and the Contrastive Language-Image Pre-training model may be used in conjunction. In some embodiments, the Image Conversion Model 105 may use an image quantization model. In some embodiments, the image quantization model may encode an image into lower-dimensional discrete latent codes. In some embodiments, the image quantization model may decode an image. In some embodiments, the Image Conversion Model 105 may use a Bidirectional Encoder Representations from Transforms (BERT) as an autoregressive transformer. In some embodiments, the Image Conversion Model 105 synthesizes a new image using a generative adversarial network. In some embodiments, Synthesis may be repeated. In some embodiments, Synthesis may be performed by requesting and receiving an image from an external image generator. In some embodiments, the external image generator may be an online image generator.

In some embodiments, the Image Conversion Model 105 may perform a Recall operation using Recall Engine 202. In some embodiments, the recall operation may include a search for a preexisting image corresponding to the input stream provided by Input Selection 104. In some embodiments, the number of images in a search may be limited to a maximum number. In some embodiments, the system may download all images found in response to a number of available images being below a certain threshold. In some embodiments, the search may be performed using an online search engine. In some embodiments, the search may be performed using a database of images. In some embodiments, Recall may be repeated.

In some embodiments, images from both Recall and Synthesis may be collected into a set of one or more images. In some embodiments, a task may be converted from a language task into a multimodal task using either the images, the text, or both. In some embodiments, the multimodal task may be provided to Vision-Text Model 204. In some embodiments, the Vision-Text Model 204 uses a CLIP model.

In some embodiments, the Language Model 106 may receive the input stream provided by Input Selection 104. In some embodiments, the Language Model 106 may receive both the Tasks 102 and the Solutions 103. In some embodiments, the Language Model 106 may transform different tasks into multi-choice questions, where input task x of Tasks 102 X and candidate solution y of Solutions 103 Y are provided.

Figure 3A:
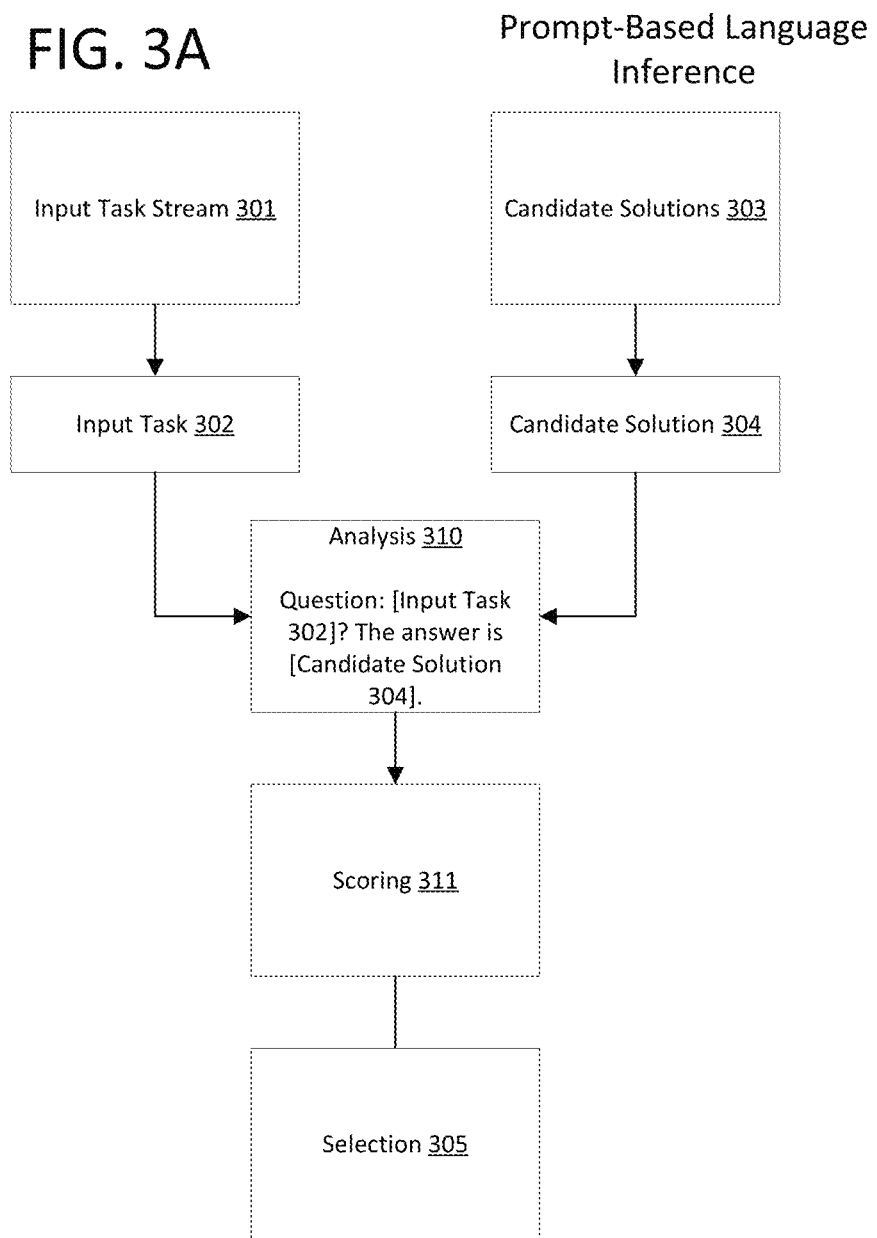
FIG. 3A is a flowchart of a language model using prompt-based language inference, in accordance with various embodiments.

In some embodiments, the Language Model 106 may use a Prompt-based Approach. An example of a Prompt-based language inference approach is illustrated in FIG. 3a. In some embodiments, Input Task Stream 301 may provide Input Task 302. In some embodiments, Candidate Solutions 303 may provide Candidate Solution 304. In some embodiments, Analysis 310 may convert Input Task 302 and Candidate Solution 304 into a Question-Answer format, such as "Question: [302]? The answer is [304]." In some embodiments, the Language Model 106 may use GPTNeo-1.3B/2.7B, GPT-J-6B and OPT-30B. In some embodiments, Scoring 311 may use softmax. In some embodiments, Scoring 311 may use GPT to score Candidate Solution 304. In some embodiments, one or more of Analysis 310, Scoring 311, or Selection 305 may be repeated. In some embodiments, one or more of Analysis 310, Scoring 311, or Selection 305 may be repeated using one or more Input Tasks 302. In some embodiments, one or more of Analysis 310, Scoring 311, or Selection 305 may be repeated using one or more Candidate Solutions 304

In some embodiments, Selection 305 may select the Candidate Solution 304 that produced the highest score. In some embodiments, Selection 305 may select the Candidate Solution 304 that produced the lowest score. In some embodiments, Selection 305 may select all Candidate Solutions 304 that produced a score above a certain threshold. In some embodiments, Selection 305 may select all Candidate Solutions 304 that produced a score below a certain threshold. In some embodiments, Selection 305, Scoring 311, Scoring 320, and Scoring 331 may be performed based on scoring or analysis of one or more of Tasks 302, Solutions 304, or a particular combination of a Input Task 302 and a Candidate Solution 304.

Figure 3B:
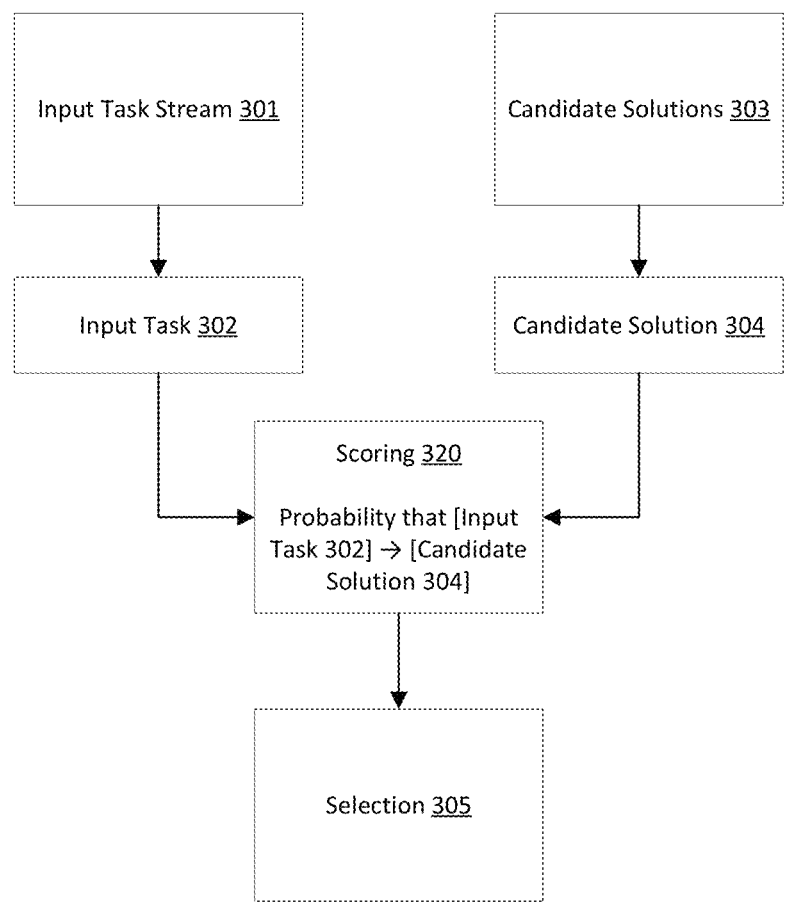
FIG. 3B is a flowchart of a language model using natural language inference, in accordance with various embodiments.

In some embodiments, the Language Model 106 may use a Natural Language Inference Approach. An example of a Natural Language Inference Approach is illustrated in FIG. 3b. In some embodiments, Input Task Stream 301 may provide Input Task 302. In some embodiments, Candidate Solutions 303 may provide Candidate Solution 304. In some embodiments, Scoring 320 scores based on the probability that an Input Task 302 logically entails a Candidate Solution 304 such that 302→304. In some embodiments, the Language Model 106 may use ROBERTa-large and BART-large models fine-tuned on Multi-genre NLI (MNLI) corpus.

In some embodiments, the Language Model 106 may use a Latent Embedding Approach. An example of a Latent Embedding Approach is illustrated in FIG. 3c. In some embodiments, Input Task Stream 301 may provide Input Task 302. In some embodiments, Candidate Solutions 303 may provide Candidate Solution 304. In some embodiments, Analysis 330 encodes a given tuple (302, 304) into a shared latent space. In some embodiments, Scoring 331 may score a given tuple based on proximity. In some embodiments, proximity is determined using a distance metric cosine similarity score. In some embodiments, the scores are normalized using softmax. In some embodiments, the Language Model 106 uses Sentence-BERT (SBERT) and SimCSE. In some embodiments SBERT uses the all-mpnet-base-v2 checkpoint. In some embodiments, the SimCSE uses unsup-simcse-roberta-large.

In some embodiments, the results of the Image Conversion Model 105 and Language Model 106 may be provided to Model Ensembling 107. In some embodiments, the Output Prediction 108 may be determined by summing the predictions of the Image Conversion Model 105 and Language Model 106. In some embodiments, the Output Prediction 108 is determined by weighting the sum of the predictions of the Image Conversion Model 105 and Language Model 106. In some embodiments, the weight is calibrated based on the relative size of the Language Model 106 and the Vision-Text Model 204.

Figure 4A:
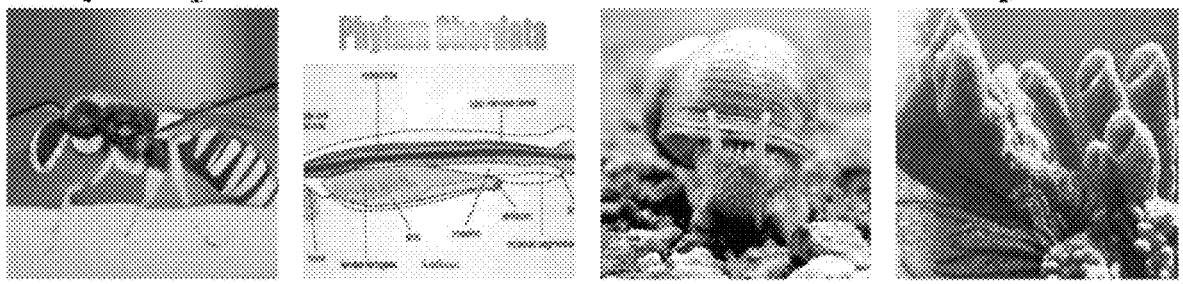
FIG. 4A illustrates an example operation of the Z-LaVI method, in accordance with various embodiments.
Figure 4B:
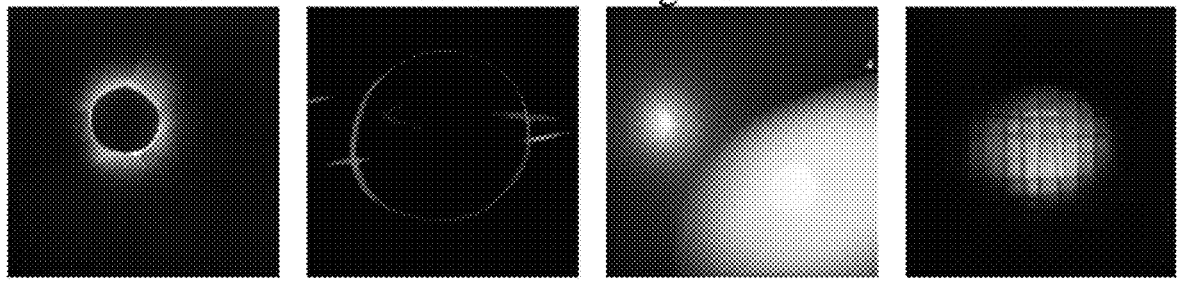
FIG. 4B illustrates an example operation of the Z-LaVI method, in accordance with various embodiments.

FIGS. 4A-4B illustrate comparisons of the performance of one embodiment of the Z-LaVI system to state of the art natural language systems on Science Question Answering Tasks involving biology and mathematics. For example, FIG. 4A shows an embodiment of the Z-LaVI system correctly answering the question "What phylum includes sponges, which are aquatic invertebrates?" after generating images corresponding to "hymenoptera", "chordata", "mollusca", and "porifera," and FIG. 4B shows Z-LaVI incorrectly answering the question "The Sun is about $1.5 \times 10^8$ km from Earth. The speed of light is $3 \times 10^8$ m/s. What's the distance from the Sun to Earth in light seconds?" after generating answers corresponding to "2.0 light-seconds", "0.5 light-seconds" "$2 \times 10^{-3}$ light-seconds" and "$5 \times 10^2$ light seconds."

FIG. 5 illustrates comparisons of the performance of one embodiment of the Z-LaVI system to state of the art natural language systems on Text Classification Tasks involving news articles. For example, row "(a)" of FIG. 5 illustrates the Z-LaVI system classifying an article about digital disposable camera as technology news, which the LM system gets wrong. Row "(b)" of FIG. 5 illustrates the Z-LaVI system classifying an article about sports as sports news, which the LM system gets wrong. Row "(c)" of FIG. 5 illustrates the Z-LaVI system classifying an article about reconstructing shelter as needing shelter, which the LM system gets wrong. Row "(d)" of FIG. 5 illustrates the Z-LaVI system incorrectly classifying an article about flooding as needing water, which the LM system gets correct.

Figure 6:
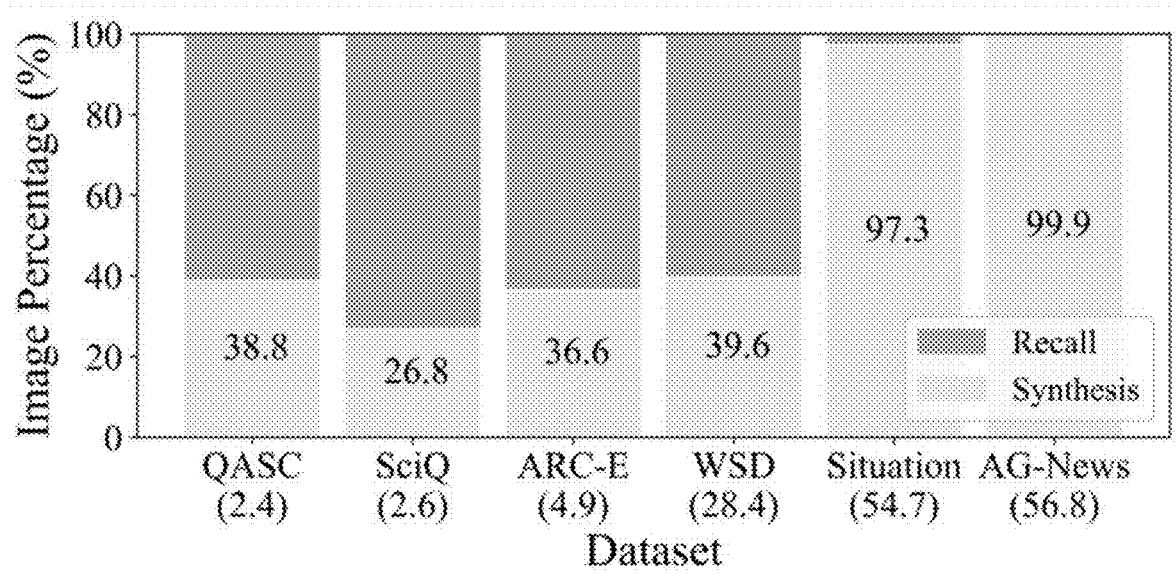
FIG. 6 demonstrates the performance advantages of the Z-LaVI method, in accordance with various embodiments.

FIG. 6 demonstrates the performance impact of including both Recall and Synthesis is classifying certain datasets. On AG-News and Situation datasets, the embodiment relied heavily on Synthesizing new images, while on Science Question datasets, the embodiment relied heavily on Recall, demonstrating the advantage of incorporating both into a single system.

Figure 7A:
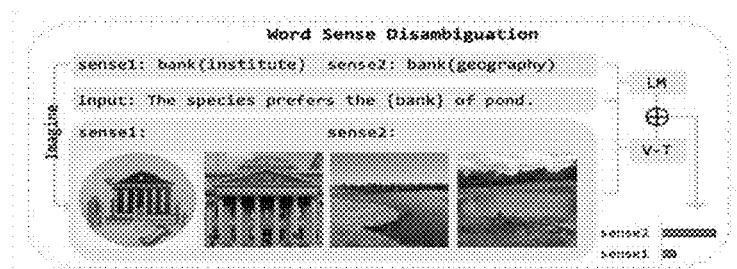
FIG. 7A illustrates the Z-LaVI method solving an exemplary task type, in accordance with various embodiments.
Figure 7B:
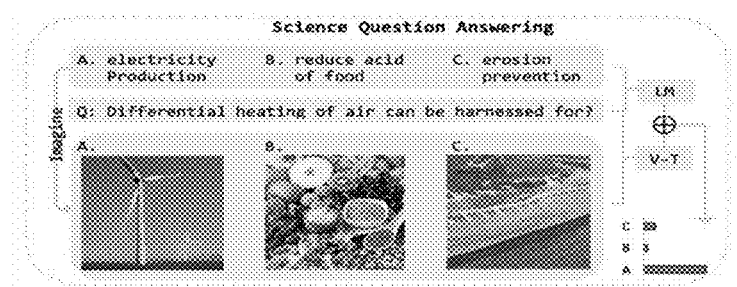
FIG. 7B illustrates the Z-LaVI method solving an exemplary task type, in accordance with various embodiments.
Figure 7C:
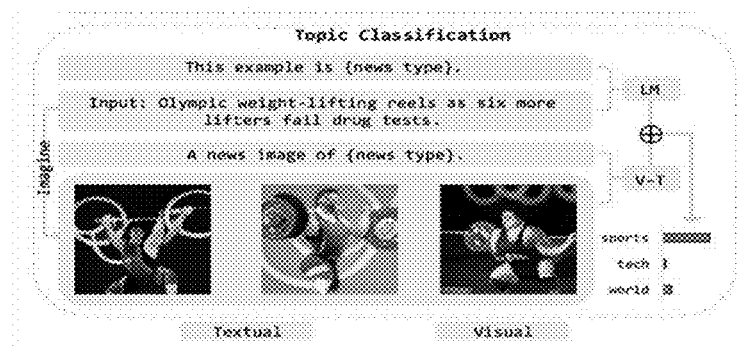
FIG. 7C illustrates the Z-LaVI method solving an exemplary task type, in accordance with various embodiments.

FIGS. 7A-7C demonstrate one embodiment of the Z-LaVI system using a combination of text and multimodal tasks to accurately assess Word Sense Disambiguation (FIG. 7A), Science Question Answering (FIG. 7B), and Topic Classification tasks (FIG. 7C).

Figure 8:
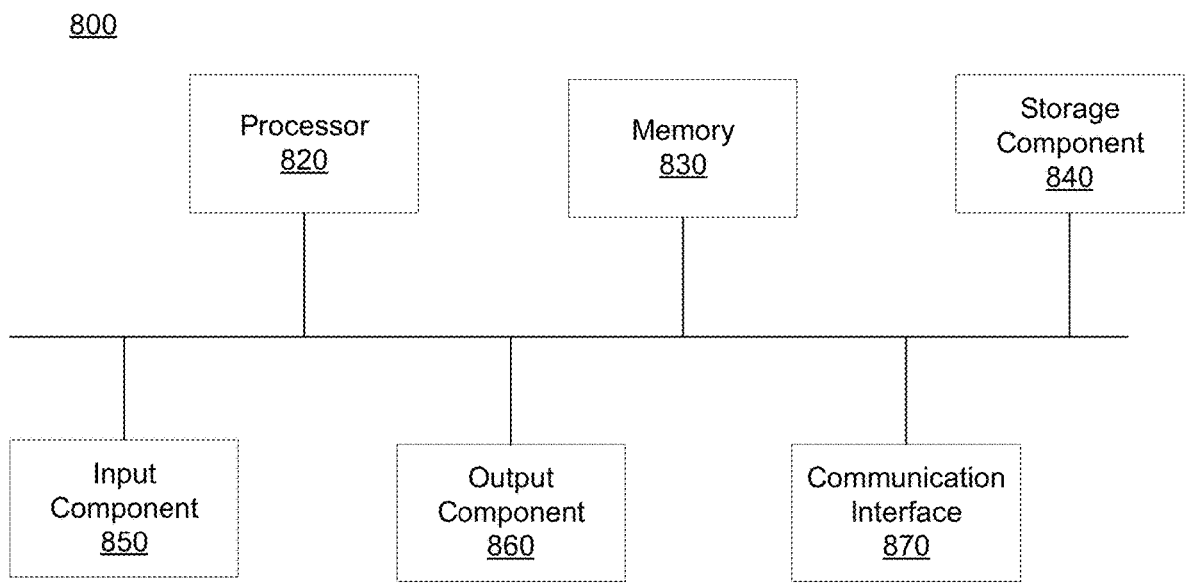
FIG. 8 is a block diagram of example components of one or more devices, in accordance with various embodiments.

FIG. 8 is a block diagram of example components of a device in which methods, apparatuses, and systems described herein may be implemented, according to embodiments. The device 800. As shown in FIG. 8, the device 800 may include a bus 810, a processor 820, a memory 830, a storage component 840, an input component 850, an output component 860, and a communication interface 870.

The bus 810 includes a component that permits communication among the components of the device 800. The processor 820 is implemented in hardware, firmware, or a combination of hardware and software. The processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some embodiments, the processor 820 includes one or more processors capable of being programmed to perform a function. The memory 830 includes a random access memory (RAM), a read only memory (ROM), and/or another type of dynamic or static storage device (e.g. a flash memory, a magnetic memory, and/or an optical memory) that stores information and/or instructions for use by the processor 820.

The storage component 840 stores information and/or software related to the operation and use of the device 800. For example, the storage component 840 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 850 includes a component that permits the device 800 to receive information, such as via user input (e.g., a touch screen display, a keyboard, a keypad, a mouse, a button, a switch, and/or a microphone). Additionally, or alternatively, the input component 850 may include a sensor for sensing information (e.g., a global positioning system (GPS) component, an accelerometer, a gyroscope, and/or an actuator). The output component 860 includes a component that provides output information from the device 800 (e.g. a display, a speaker, and/or one or more light-emitting diodes (LEDs)).

The communication interface 870 includes a transceiver-like component (e.g., a transceiver and/or a separate receiver and transmitter) that enables the device 200 to communicate with other devices, such as via a wired connection, a wireless connection, or a combination of wired and wireless connections. The communication interface 870 may permit the device 200 to receive information from another device and/or provide information to another device. For example, the communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

The device 800 may perform one or more processes described herein. The device 800 may perform these processes in response to the processor 820 executing software instructions stored by a non-transitory computer-readable medium, such as the memory 830 and/or the storage component 840. A computer-readable medium is defined herein as a non-transitory memory device. A memory device includes memory space within a single physical storage device or memory space spread across multiple physical storage devices.

Software instructions may be read into the memory 830 and/or the storage component 840 from another computer-readable medium or from another device via the communication interface 870. When executed, software instructions stored in the memory 830 and/or the storage component 840 may cause the processor 820 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 8 are provided as an example. In practice, the device 800 may include additional components, fewer components, different components, or differently arranged components than those shown in FIG. 8. Additionally, or alternatively, a set of components (e.g., one or more components) of the device 800 may perform one or more functions described as being performed by another set of components of the device 800.

FIG. 9 illustrates the enhanced performance provided by one embodiment of the Z-LaVI system across a variety of datasets when compared to state of the art natural language classifiers.

In some embodiments, The GPT-style and NLIbased language models described herein may be built on top of the huggingface API. In some embodiments, CLIP models described herein may use a ViT/B32 as an image encoder.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term component is intended to be broadly construed as hardware, firmware, or a combination of hardware and software.

Even though combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below: A first method performed by at least one processor for processing language, the method comprising: receiving a first input stream of a task; receiving a second input stream of a solution; selecting the first input stream or the second input stream; providing the selected input stream to an image conversion model and a language model; creating, based on the selected input stream, a model ensemble of the image conversion model and the language model; and outputting a prediction based on the model ensemble.

The first method described above, wherein the language model uses a prompt based approach, and wherein the language model is a Generative Pre-Trained Transformer (GPT) model.

The first method described above, wherein the task is at least one of word sense disambiguation, science question answering, or text classification, wherein the prediction comprises at least one possible word sense of a target word based on the task being the word sense disambiguation; the prediction comprises an answer of a question based on the task being the task being the science question answering, and the prediction comprises a category of text based on the task being the text classification.

A fourth method, including the first method, wherein the language model uses a Bidirectional Encoder Representations from Transforms (BERT).

The fourth method, wherein the language model uses a natural language inference approach.

The fourth method, wherein the language model uses a latent embedding approach.

The seventh method, including the first method, wherein the image conversion model uses a combined approach of recall and synthesis.

The seventh method, wherein the synthesis includes a text to image generation model.

The seventh method, wherein the synthesis includes a generative adversarial network.

The first method, wherein the model ensemble weights constituent models of the image conversion model and the language model based on a relative size of each constituent model.

A first apparatus comprising: at least one memory configured to store program code; and at least one processor configured to read the program code and operate as instructed by the program code, the program code comprising: receiving code configured to cause the at least one processor to receive a first input stream of a task and a second input stream of a solution, selecting code configured to cause the at least one processor to select the first input stream or the second input stream, providing code configured to cause the at least one processor to provide the selected input stream to an image conversion model and a language model, ensembling code configured to cause the at least one processor to create, based on the selected input stream, a model ensemble of the image conversion model and the language model, and outputting code configured to cause the at least one processor to output a prediction based on the model ensemble.

The first apparatus, wherein the language model uses a prompt based approach, and wherein the language model is a Generative Pre-Trained Transformer (GPT) model.

The first apparatus, wherein the task is at least one of word sense disambiguation, science question answering, or text classification, wherein the prediction comprises at least one possible word sense of a target word based on the task being the word sense disambiguation; the prediction comprises an answer of a question based on the task being the science question answering, and the prediction comprises a category of text based on the task being the text classification.

A fourth apparatus, including the first apparatus, wherein the language model uses a Bidirectional Encoder Representations from Transforms (BERT).

The fourth apparatus, wherein the language model uses a natural language inference approach or a latent embedding approach.

A sixth apparatus, including the first apparatus, wherein the image conversion model uses a combined approach of recall and synthesis.

The sixth apparatus, wherein the synthesis includes a text to image generation model.

The sixth apparatus, wherein the synthesis includes a generative adversarial network.

The first apparatus, wherein the model ensemble weights constituent models of the image conversion model and the language model based on a relative size of each constituent model.

A non-transitory computer readable medium having instructions stored therein, which when executed by a processor cause the processor to execute a method comprising: receiving a first input stream of a task; receiving a second input stream of a solution; selecting the first input stream or the second input stream; providing the selected input stream to an image conversion model and a language model; creating, based on the selected input stream, a model ensemble of the image conversion model and the language model; and outputting a prediction based on the model ensemble.

What is claimed is:

1. A method performed by at least one processor for processing language, the method comprising:
   receiving a first input stream of a task;
   receiving a second input stream of a solution;
   selecting the first input stream or the second input stream;
   providing the selected input stream to an image conversion model and a language model;
   creating, based on the selected input stream, a model ensemble from outputs of the image conversion model and from outputs of the language model;
   scoring a first plurality of candidate solutions obtained from the second input stream via the language model;
   selecting, from the first plurality of candidate solutions, a second plurality of candidate solutions with scores exceeding a threshold; and
   outputting a prediction based on the model ensemble and the second plurality of candidate solutions.

2. The method of claim 1, wherein the language model uses a prompt based approach, and wherein the language model is a Generative Pre-Trained Transformer (GPT) model.

3. The method of claim 1, wherein the task is at least one of word sense disambiguation, science question answering, or text classification, wherein the prediction comprises at least one possible word sense of a target word based on the task being the word sense disambiguation; the prediction comprises an answer of a question based on the task being the science question answering, and the prediction comprises a category of text based on the task being the text classification.

4. The method of claim 1, wherein the language model uses a Bidirectional Encoder Representations from Transformers (BERT).

5. The method of claim 4, wherein the language model uses a natural language inference approach.

6. The method of claim 4, wherein the language model uses a latent embedding approach.

7. The method of claim 1, wherein the image conversion model uses a combined approach of recall and synthesis.

8. The method of claim 7, wherein the synthesis includes a text to image generation model.

9. The method of claim 7, wherein the synthesis includes a generative adversarial network.

10. The method of claim 1, wherein the model ensemble weights constituent models of the image conversion model and the language model based on a relative size of each constituent model.

11. An apparatus comprising:
    at least one memory configured to store program code; and
    at least one processor configured to read the program code and operate as instructed by the program code, the program code comprising:
    receiving code configured to cause the at least one processor to receive a first input stream of a task and a second input stream of a solution;
    selecting code configured to cause the at least one processor to select the first input stream or the second input stream;
    providing code configured to cause the at least one processor to provide the selected input stream to an image conversion model and a language model;
    ensembling code configured to cause the at least one processor to create, based on the selected input stream, a model ensemble from outputs of the image conversion model and from outputs of the language model;
    scoring code configured to cause the at least one processor to score a first plurality of candidate solutions obtained from the second input stream via the language model;
    selecting code configured to cause the at least one processor to select, from the first plurality of candidate solutions, a second plurality of candidate solutions with scores exceeding a threshold; and
    outputting code configured to cause the at least one processor to output a prediction based on the model ensemble and the second plurality of candidate solutions.

12. The apparatus of claim 11, wherein the language model uses a prompt based approach, and wherein the language model is a Generative Pre-Trained Transformer (GPT) model.

13. The apparatus of claim 11, wherein the task is at least one of word sense disambiguation, science question answering, or text classification, wherein the prediction comprises at least one possible word sense of a target word based on the task being the word sense disambiguation; the prediction comprises an answer of a question based on the task being the science question answering, and the prediction comprises a category of text based on the task being the text classification.

14. The apparatus of claim 11, wherein the language model uses a Bidirectional Encoder Representations from Transformers (BERT).

15. The apparatus of claim 14, wherein the language model uses a natural language inference approach or a latent embedding approach.

16. The apparatus of claim 11, wherein the image conversion model uses a combined approach of recall and synthesis.

17. The apparatus of claim 16, wherein the synthesis includes a text to image generation model.

18. The apparatus of claim 16, wherein the synthesis includes a generative adversarial network.

19. The apparatus of claim 11, wherein the model ensemble weights constituent models of the image conversion model and the language model based on a relative size of each constituent model.

20. A non-transitory computer readable medium having instructions stored therein, which when executed by a processor cause the processor to execute a method comprising:
    receiving a first input stream of a task;
    receiving a second input stream of a solution;
    selecting the first input stream or the second input stream;
    providing the selected input stream to an image conversion model and a language model;
    creating, based on the selected input stream, a model ensemble from outputs of the image conversion model and from outputs of the language model;

scoring a first plurality of candidate solutions obtained from the second input stream via the language model;

selecting, from the first plurality of candidate solutions, a second plurality of candidate solutions with scores exceeding a threshold; and outputting a prediction based on the model ensemble and the second plurality of candidate solutions.

\* \* \* \* \*